(12) United States Patent
Riedijk et al.

(10) Patent No.: US 10,102,412 B2
(45) Date of Patent: Oct. 16, 2018

(54) FINGERPRINT SENSING WITH DIFFERENT CAPACITIVE CONFIGURATIONS

(71) Applicant: Fingerprint Cards AB, Göteborg (SE)

(72) Inventors: Frank Riedijk, Delft (NL); Hans Thörnblom, Kungsbacka (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/623,800

(22) Filed: Jun. 15, 2017

(65) Prior Publication Data

US 2018/0137327 A1    May 17, 2018

(30) Foreign Application Priority Data

Nov. 17, 2016    (SE) .................... 16515017

(51) Int. Cl.
*G06K 9/00*    (2006.01)

(52) U.S. Cl.
CPC ....... *G06K 9/0002* (2013.01); *G06K 9/00067* (2013.01)

(58) Field of Classification Search
CPC .......................... G06K 9/0002; G06K 9/00067
See application file for complete search history.

(56) References Cited

U.S. PATENT DOCUMENTS

| | | | |
|---|---|---|---|
| 6,320,394 B1 * | 11/2001 | Tartagni | G01B 7/004 324/662 |
| 6,927,581 B2 * | 8/2005 | Gozzini | G06K 9/0002 324/663 |
| 7,864,992 B2 * | 1/2011 | Riedijk | G06K 9/0002 382/124 |
| 8,888,004 B2 | 11/2014 | Setlak et al. | |
| 9,152,841 B1 * | 10/2015 | Riedijk | G06K 9/0002 |

(Continued)

FOREIGN PATENT DOCUMENTS

| WO | 2015147727 A1 | 10/2015 |
|---|---|---|
| WO | 2016130070 A1 | 8/2016 |

OTHER PUBLICATIONS

Nam, J., et al., "Design and Implementation of 160 x 192 Pixel Array Capacitive-Type Fingerprint Sensor", Circuits, Systems and Signal Processing, vol. 24, No. 4, 2005.

(Continued)

*Primary Examiner* — John Strege
(74) *Attorney, Agent, or Firm* — RMCK Law Group PLC

(57) ABSTRACT

A method of determining a physical property of a finger using a sensor comprising a two-dimensional measuring arrangement including a plurality of measuring elements, each defining a measuring element position in the measuring arrangement, and each comprising a finger electrode spaced apart from the finger by a dielectric structure. For each measuring element position, the method comprises the steps of performing a first sensing operation using a first capacitive configuration, acquiring a first measurement value for the first capacitive configuration, performing a second sensing operation using a second capacitive configuration, acquiring a second measurement value for the second capacitive configuration. The physical property of the finger is determined based on the first and second measurement values for each measuring element position.

15 Claims, 14 Drawing Sheets

(56) References Cited

U.S. PATENT DOCUMENTS

| | | | |
|---|---|---|---|
| 9,383,876 B2 | 7/2016 | Riedijk et al. | |
| 9,704,012 B2* | 7/2017 | Kravets | G06K 9/0008 |
| 2005/0031175 A1* | 2/2005 | Hara | G06K 9/0002 |
| | | | 382/124 |
| 2006/0076963 A1* | 4/2006 | Miyasaka | G06K 9/0002 |
| | | | 324/662 |
| 2013/0148258 A1* | 6/2013 | Chen | H01L 23/5223 |
| | | | 361/303 |
| 2013/0181949 A1 | 7/2013 | Setlak | |
| 2013/0271422 A1* | 10/2013 | Hotelling | G06F 3/044 |
| | | | 345/174 |
| 2013/0294662 A1* | 11/2013 | Franza | G06K 9/0002 |
| | | | 382/124 |
| 2013/0314105 A1* | 11/2013 | Setlak | G01R 27/2605 |
| | | | 324/663 |
| 2015/0015537 A1* | 1/2015 | Riedijk | G06F 3/044 |
| | | | 345/174 |
| 2016/0104024 A1 | 4/2016 | Sløgedal et al. | |

OTHER PUBLICATIONS

Swedish Search Report for Swedish Patent Application No. 16515017 dated May 24, 2017, 2 pages.

* cited by examiner

FINGERPRINT SENSING WITH DIFFERENT CAPACITIVE CONFIGURATIONS

CROSS-REFERENCE TO RELATED APPLICATIONS

This application claims priority to Sweden Application No. 1651501-7, filed on Nov. 17, 2016, the disclosure of which is incorporated herein by reference in its entirety.

FIELD OF THE INVENTION

The present invention relates to a fingerprint sensing system and to a method of determining a physical property of a finger.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

Among the various available fingerprint sensing principles (such as capacitive, optical, acoustic, thermal etc), capacitive sensing is most commonly used, in particular in applications where size and power consumption are important issues.

Capacitive fingerprint sensors generally provide a measure indicative of the capacitance between each of several sensing structures and a finger placed on or moved across the surface of the fingerprint sensor.

Some capacitive fingerprint sensors passively read out the capacitance between the sensing structures and the finger. This, however, requires a relatively large capacitance between sensing structure and finger. Therefore such passive capacitive sensors are typically provided with a very thin protective layer covering the sensing structures, which makes such sensors rather sensitive to scratching and/or ESD (electro-static discharge).

U.S. Pat. No. 7,864,992 discloses a capacitive fingerprint sensing system in which a driving signal is injected into the finger by pulsing a conductive structure arranged in the vicinity of the sensor array and measuring the resulting change of the charge carried by the sensing structures in the sensor array.

This type of so-called active capacitive fingerprint sensing systems generally enables measurement of the capacitance between finger and sensing structures with a much higher signal-to-noise ratio than the above-mentioned passive systems. This, in turn, allows for a considerably thicker protective coating and thus for more robust capacitive fingerprint sensors that can be included in items subjected to considerable wear, such as mobile phones.

For even further increased robustness and ease of integration of the fingerprint sensor into electronic devices etc, it is, however, desirable to enable fingerprint sensing through a very thick dielectric structure, which may be several hundreds of microns thick. For instance, it may be desirable to enable fingerprint sensing through a glass plate or similar, such as the front glass cover of a mobile phone.

When sensing through such a thick dielectric structure, the actual resolution of the resulting fingerprint image may be reduced since the area of the finger seen by each sensing structure is increased.

To mitigate this problem, U.S. Pat. No. 8,888,004 proposes to reconstruct shape information from differential pixel measurements using a kernel-based reconstructing process.

Although the approach proposed by U.S. Pat. No. 8,888,004 may be potentially useful for sharpening the fingerprint image, the suggested solution requires the fingerprint sensor to be capable of programmable differential pixel measurements. Furthermore, the suggested solution is expected to be rater complex and difficult to implement in practice.

Further, it would be desirable to provide for the determination of another physical property of the finger than a representation of the fingerprint pattern, such as the moisture level at the finger surface or properties useable for identifying a spoof attempt.

SUMMARY

In view of the above-mentioned and other drawbacks of the prior art, it is an object of the present invention to provide for improved finger sensing, in particular through a thick dielectric structure.

According to a first aspect of the present invention, it is therefore provided a method of determining a physical property of a finger using a sensor comprising a two-dimensional measuring arrangement including a plurality of measuring elements, each defining a measuring element position in the measuring arrangement, and each comprising a finger electrode spaced apart from the finger by a dielectric structure, the method comprising the steps of: performing, for each measuring element position, a first sensing operation using an evaluated measuring element defining the measuring element position, and at least a first different measuring element defining a first different measuring element position, the finger electrode of the evaluated measuring element exhibiting a first finger electrode potential and the finger electrode of the first different measuring element exhibiting a second finger electrode potential different from the first finger electrode potential to provide a first potential difference between the finger electrode of the evaluated measuring element and the finger electrode of the first different measuring element; acquiring, for each measuring element position, a first measurement value based on a first sensing signal from one of the evaluated measuring element and the first different measuring element, resulting in a plurality of first measurement values; performing, for each measuring element position, a second sensing operation using the evaluated measuring element, and at least a second different measuring element defining a second different measuring element position, the finger electrode of the evaluated measuring element exhibiting a third finger electrode potential and the finger electrode of the second different measuring element exhibiting a fourth finger electrode potential different from the third finger electrode potential to provide a second potential difference between the finger electrode of the evaluated measuring element and the finger electrode of the second different measuring element; acquiring, for each measuring element position, a second measurement value based on a second sensing signal from one of the evaluated measuring element and the second different measuring element, resulting in a plurality of second measurement values; and determining the physical property of the finger based on the plurality of first measurement values and the plurality of second measurement values.

The "physical property" of the finger may, for instance, be a representation of a fingerprint pattern, a presence or distribution of moisture, or an indication of electrical properties of the skin, etc.

In embodiments where the above-mentioned physical property is a representation of the fingerprint pattern of the finger, then the representation of the fingerprint pattern of the finger need not necessarily be a digital gray scale image, but may be any suitable representation from which fingerprint pattern information can be deduced. The representation of the fingerprint pattern may, for example, be raw fingerprint image data, or the data may have been processed and may then be provided in the form of conditioned image data, as fingerprint template data or in any other form.

The measuring elements may be arranged in any suitable two-dimensional measuring arrangement, such as a planar array in which the measuring elements are arranged in rows and columns. There may, however, be embodiments in which the measuring elements are not arranged in rows and columns.

The finger electrode of each measuring element may, for example, be provided in the form of a metal plate. It should, however, be noted that the finger electrode may be realized as any suitable electrically conductive structure. Each measuring element may be a differential measuring element. In such embodiments, each measuring element comprises at least two finger electrodes.

It should be noted that the finger electrode potentials of the measuring elements are present during the respective sensing operations. It should also be noted that some (at least one) finger electrode potentials may be time-varying and that some finger electrode potentials may be constant.

Furthermore, the second different measuring element is different from the first different measuring element. Accordingly, the second different measuring element position is different from the first different measuring element position.

The present invention is based on the realization that, for a given measuring element position, the capacitive couplings between the evaluated measuring element defining the measuring element position and several different measuring elements can be used to estimate the capacitive coupling between the evaluated measuring element and the surface of the finger directly opposite the evaluated measuring element. A measure of this capacitive coupling may be referred to as a finger coupling value for the measuring element position.

Depending on how the different measuring elements are controlled, the first and second sensing operations may take place simultaneously, or be separated in time.

In embodiments where the evaluated measuring element provides the first sensing signal in the first sensing operation and the second sensing signal in the second sensing operation, the first and second sensing operations are separated in time.

In embodiments where the first different measuring element provides the first sensing signal in the first sensing operation and the second different measuring element provides the second sensing signal in the second sensing operation, the first and second sensing operations may take place simultaneously, or be separated in time.

In various embodiments, the above-mentioned first finger electrode potential and the above-mentioned third finger electrode potential may be substantially identical. In particular, the amplitude of the first and third finger electrode potentials at different times in the respective sensing operations may be substantially the same. By "substantially the same" should be understood close to each other, such as deviating from each other by less than 5% on average. In embodiments where the first and second operations take place simultaneously, the first and third finger electrode potentials are obviously identical.

Analogously, in various embodiments, the above-mentioned second finger electrode potential and the above-mentioned fourth finger electrode potential may be substantially identical. In particular, the amplitude of the second and fourth finger electrode potentials at different times in the respective sensing operations may be substantially the same. By "substantially the same" should be understood close to each other, such as deviating from each other by less than 5% on average.

In other embodiments, the above-mentioned second finger electrode potential and the above-mentioned fourth finger electrode potential may be different. In particular, the second finger electrode potential and the fourth finger electrode potential may be selected to provide for increased focusing or for identification of finger moisture etc. The potentials may be selected based on calculations, simulations, or may be empirically determined.

Depending on how the various finger electrode potentials are selected, the finger coupling value for each measuring element position can be determined in various ways. If substantially the same finger electrode potentials are used for the first and second (and possibly further) different measuring elements, the different sensing signals (or measurement values indicative of the sensing signals) may be assigned different weights and then added up (or averaged) to form combined measurement values. If different finger electrode potentials are selected for the first and second (and possibly further) different measuring elements, the different sensing signals (or measurement values indicative of the sensing signals) may all be assigned the same weights and then added up (or averaged) to form combined measurement values. More advanced schemes for combining measurement values can be used for obtaining a more complete and/or more accurate representation of the object (such as a finger) on the surface of the sensor. For instance, techniques similar to those developed for use with electrical capacitance tomography may advantageously be used.

The first sensing signal may be an indication of the capacitive coupling between the finger electrode of the evaluated measuring element and the finger electrode of the first different measuring element, and the second sensing signal may be an indication of the capacitive coupling between the finger electrode of the evaluated measuring element and the finger electrode of the second different measuring element. Since the first different measuring element and the second different measuring element are at mutually different measuring element positions, the capacitive couplings between the finger electrode of the evaluated measuring element and the finger electrodes of the first and second different measuring elements, respectively, will be influenced by different parts of the skin opposite the involved measuring elements (including in the depth direction of the skin).

Using a larger number of sensing operations with a larger number of different measuring elements at different measuring element positions will provide more information about the skin and will also allow an accurate estimation of the capacitive coupling between the evaluated measuring element and the portion of the finger directly opposite (such as above) the measuring element position. However, already two sensing operations including the evaluated measuring element and the first and second different measuring elements will provide more information than a single sensing operation and allow improved finger sensing through a thick dielectric structure.

According to embodiments, the measuring elements providing the sensing signals may be configured to sense the capacitive coupling as charge carried by the respective finger electrodes.

Hence, in these embodiments, the first sensing signal may be indicative of a charge carried by the finger electrode of the one of the evaluated measuring element and the first different measuring element providing the first sensing signal; and the second sensing signal may be indicative of a charge carried by the finger electrode of the one of the evaluated measuring element and the second different measuring element providing the second sensing signal.

According to various embodiments, the first different measuring element may be arranged at a first lateral distance (along the surface of the measuring arrangement) from the evaluated measuring element; and the second different measuring element may be arranged at a second lateral distance from the evaluated measuring element, the second lateral distance being different from the first lateral distance.

In these embodiments, the determination of the physical property of the finger may further be based on the first lateral distance and the second lateral distance.

According to various embodiments, furthermore, the step of performing, for each measuring element position, the first sensing operation may comprise changing the first potential difference from being a first potential difference value at a first point in time to being a second potential difference value at a second point in time; and the step of performing, for each measuring element position, the second sensing operation may comprise changing the second potential difference from a being third potential difference value at a third point in time to being a fourth potential difference value at a fourth point in time.

Taking the first sensing operation as an illustrative example, when the first potential difference between the potential of the finger electrode of the evaluated measuring element and the potential of the finger electrode of the first different measuring element is changed, the charge carried by the finger electrode of the one of said evaluated measuring element and the first different measuring element providing the first sensing signal will also change. The change in the charge, resulting from a known change in potential difference, is an indication of the capacitive coupling between the finger electrode of the evaluated measuring element and the finger electrode of the first different measuring element, through a dielectric structure including the protective dielectric structure and the finger placed on top of the protective dielectric structure.

As was explained further above, depending on how the measuring elements are controlled, the first sensing operation and the second sensing operation may be performed simultaneously. In such embodiments, the first point in time and the third point in time may coincide, and the second point in time and the fourth point in time may coincide.

In these embodiments, the step of acquiring, for each measuring element position, the first sensing signal from one of the evaluated measuring element and the first different measuring element may comprise sampling the first sensing signal at the first point in time, and sampling the first sensing signal at the second point in time; and the step of acquiring, for each measuring element position, the second sensing signal from one of the evaluated measuring element and the second different measuring element may comprise sampling the second sensing signal at the third point in time, and sampling the second sensing signal at the fourth point in time.

By taking the difference between the sampled values before and after the change in potential difference, the influence of common mode noise can be reduced.

As was mentioned further above, additional sensing operations will improve the determination of the physical property of the finger, such as the representation of the fingerprint pattern.

According to embodiments, the method of the present invention may therefore further comprise the steps of: performing, for each measuring element position, a third sensing operation using the evaluated measuring element, and at least a third different measuring element defining a third different measuring element position, the finger electrode of the evaluated measuring element exhibiting a fifth finger electrode potential and the finger electrode of the third different measuring element exhibiting a sixth electrode potential different from the fifth finger electrode potential to provide a third potential difference between the finger electrode of the evaluated measuring element and the finger electrode of the third different measuring element; and acquiring, for each measuring element position, a third sensing signal from one of the evaluated measuring element and the third different measuring element, wherein, for each measuring element position, the finger coupling value for the measuring element position is further based on the third sensing signal.

The third different measuring element may be arranged at a third lateral distance, different from the above-mentioned first and second lateral distances, from the evaluated measuring element, and the determination may further be based on the first, second and third lateral distances.

According to a second aspect of the present invention, there is provided a finger sensing system for determining a physical property of a finger, the finger sensing system comprising: a two-dimensional measuring arrangement including a plurality of measuring elements, each defining a measuring element position in the measuring arrangement, and each comprising a finger electrode spaced apart from the finger by a dielectric structure; measurement control circuitry connected to the measuring arrangement for: controlling the measuring arrangement to perform, for each measuring element position, a first sensing operation using an evaluated measuring element defining the measuring element position, and at least a first different measuring element defining a first different measuring element position, the finger electrode of the evaluated measuring element exhibiting a first finger electrode potential and the finger electrode of the first different measuring element exhibiting a second finger electrode potential different from the first finger electrode potential to provide a first potential difference between the finger electrode of the evaluated measuring element and the finger electrode of the first different measuring element; and controlling the measuring arrangement to perform, for each measuring element position, a second sensing operation using the evaluated measuring element, and at least a second different measuring element defining a second different measuring element position, the finger electrode of the evaluated measuring element exhibiting a third finger electrode potential and the finger electrode of the second different measuring element exhibiting a fourth finger electrode potential different from the third finger electrode potential to provide a second potential difference between the finger electrode of the evaluated measuring element and the finger electrode of the second different measuring element; and signal processing circuitry for: acquiring, for each measuring element position in the measuring arrangement, a first measurement value based on a first sensing signal from one of the evaluated measuring element and the first different measuring element, resulting in a plurality of first measurement values; acquiring, for each measuring element position in the measuring arrangement, a second measurement value based on a second sensing signal from one of the evaluated measuring element and the second different measuring element, resulting in a plurality of second measurement values; and determining the physical property of the finger based on the plurality of first measurement values and the plurality of second measurement values.

Each of the measurement control circuitry and the signal processing circuitry may be implemented in hardware, software or a combination of hardware and software. Furthermore, the two-dimensional measuring arrangement may be included in a fingerprint sensor component, and at least a portion of the measurement control circuitry and/or the signal processing circuitry may be included in such a fingerprint sensor component. For instance, the measuring arrangement and the measurement control circuitry may be included in the fingerprint sensor component, and the signal processing circuitry may be at least partly provided external from the fingerprint sensor component.

According to various embodiments, each measuring element in the measuring arrangement may be controllable to provide a sensing signal. In other words, each measuring element may be controllable between at least a first state in which the measuring element provides a sensing signal and the finger electrode of the measuring element exhibits a given potential and a second state in which the measuring element does not provide a sensing signal and the finger electrode of the measuring element exhibits another potential different from the above-mentioned given potential. Advantageously, each measuring element may further be controllable to a third state in which the measuring element does not provide a sensing signal and the finger electrode of the measuring element exhibits the given potential. This third state may be referred to as a "non-sensing" state.

According to various embodiments, each measuring element in the measuring arrangement may comprise: a charge amplifier comprising: a first input; a second input; an output capacitively coupled to the first input; and at least one amplifier stage between the first and second inputs, and the output.

In a charge amplifier, the potential at the first input (often referred to as the 'negative' input) will follow the potential at the second input (often referred to as the 'positive' input). In other words, a change in the potential at the second input results in a substantially corresponding change in the potential at the first input. Depending on the actual configuration of the charge amplifier, the potential at the first input may be substantially the same as the potential at the second input, or there may be a substantially constant potential difference between the first and second inputs. If, for instance, the amplifier stage in the charge amplifier is a single stage amplifier with a single sense transistor, the potential difference may be the gate-source voltage of the sense transistor.

According to various embodiments, furthermore, the finger sensing system may additionally comprise excitation signal providing circuitry for achieving the above-mentioned first and second potential differences and/or for providing an excitation signal to the finger and/or to a reference potential plane of the measuring arrangement.

In embodiments, the excitation signal providing circuitry may be connected to the second input of each of the charge amplifiers and configured to selectively change a potential at the second input, to thereby change a potential of the finger electrode.

The excitation signal providing circuitry could be switching circuitry configured to switch between two or more different potentials provided on different lines. Alternatively or in combination, the excitation signal providing circuitry may comprise at least one signal source configured to provide a time-varying potential, such as a square wave voltage signal or a sine wave voltage signal.

The finger sensing system according to various embodiments of the present invention may, moreover, advantageously be included in an electronic device further comprising processing circuitry configured to: acquire a representation of the fingerprint pattern from the fingerprint sensing system; authenticate a user based on the representation; and perform at least one user-requested process only if the user is authenticated based on the representation. The electronic device may, for example, be a handheld communication device, such as a mobile phone or a tablet, a computer, or an electronic wearable item such as a watch or similar.

Further embodiments of, and effects obtained through this second aspect of the present invention are largely analogous to those described above for the first aspect of the invention.

In summary, the present invention relates to a method of determining a physical property of a finger using a sensor comprising a two-dimensional measuring arrangement including a plurality of measuring elements, each defining a measuring element position in the measuring arrangement, and each comprising a finger electrode spaced apart from the finger by a dielectric structure. For each measuring element position, the method comprises the steps of performing a first sensing operation using a first capacitive configuration, acquiring a first measurement value for the first capacitive configuration, performing a second sensing operation using a second capacitive configuration, acquiring a second measurement value for the second capacitive configuration. The physical property of the finger is determined based on the first and second measurement values for each measuring element position.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the finger sensing system and method according to the present invention are mainly described with reference to a fingerprint sensing system and method in which a single first different measuring element and a single second different measuring element are arranged spaced apart from the evaluated measuring element on the same side of the evaluated measuring element.

It should be noted that this by no means limits the scope defined by the appended claims, which equally well includes, for example, finger sensing systems and methods with a plurality of first (second) different measuring elements arranged in various configurations in relation to the evaluated measuring element.

Furthermore, in the embodiments described herein, the finger electrodes of the measuring elements providing the sensing signals are kept at a constant potential in relation to a sensor ground potential, while time-varying potentials are provided to the first different measuring element and the second different measuring element (and the third different measuring element), in order to achieve the desired potential difference(s). It should be noted that the desired potential difference may be achieved in other ways. For instance, a time-varying potential may be provided to the finger electrodes of the measuring elements providing the sensing signals, as is described in U.S. Pat. No. 9,152,841, which is hereby incorporated by reference, in its entirety. Alternatively, or in combination, a time-varying reference potential may be provided to the finger sensor, and a time-varying potential may be provided, in anti-phase, to the measuring elements not providing the sensing signal. This potential providing scheme is described in detail in U.S. Pat. No. 9,383,876, which is hereby incorporated by reference, in its entirety.

Figure 1:
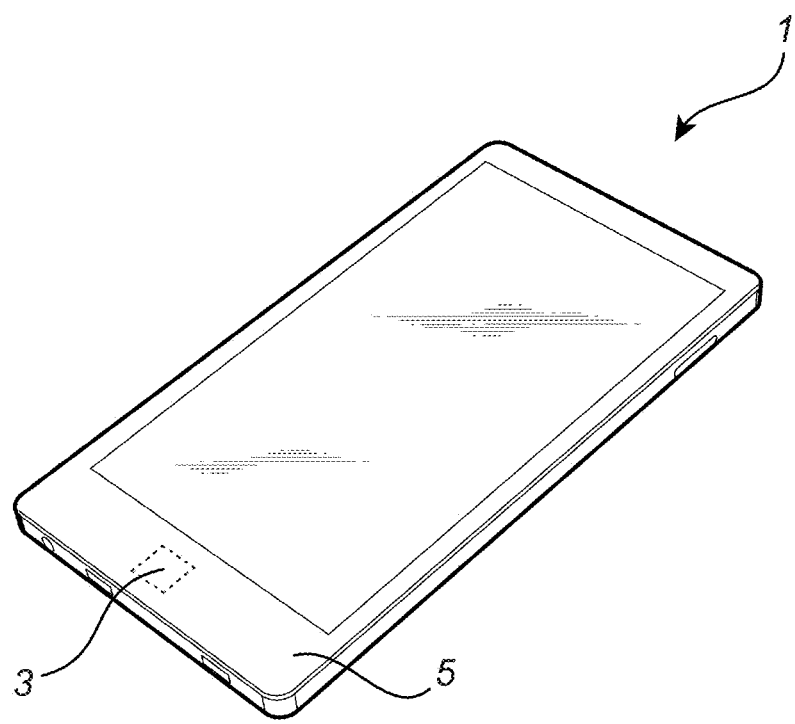
FIG. 1 schematically shows an electronic device comprising a capacitive fingerprint sensor under a cover glass.

FIG. 1 schematically illustrates an application for a finger sensing device according to an example embodiment of the present invention, in the form of a mobile phone 1 with an integrated fingerprint sensing system 3. The fingerprint sensing system 3 may, for example, be used for unlocking the mobile phone 1 and/or for authorizing transactions carried out using the mobile phone, etc. As is schematically indicated in FIG. 1, the fingerprint sensing system 3 is arranged under a cover glass 5 of the mobile phone, which may, for instance, be in the range of 0.2-0.5 mm thick.

Figure 2A:
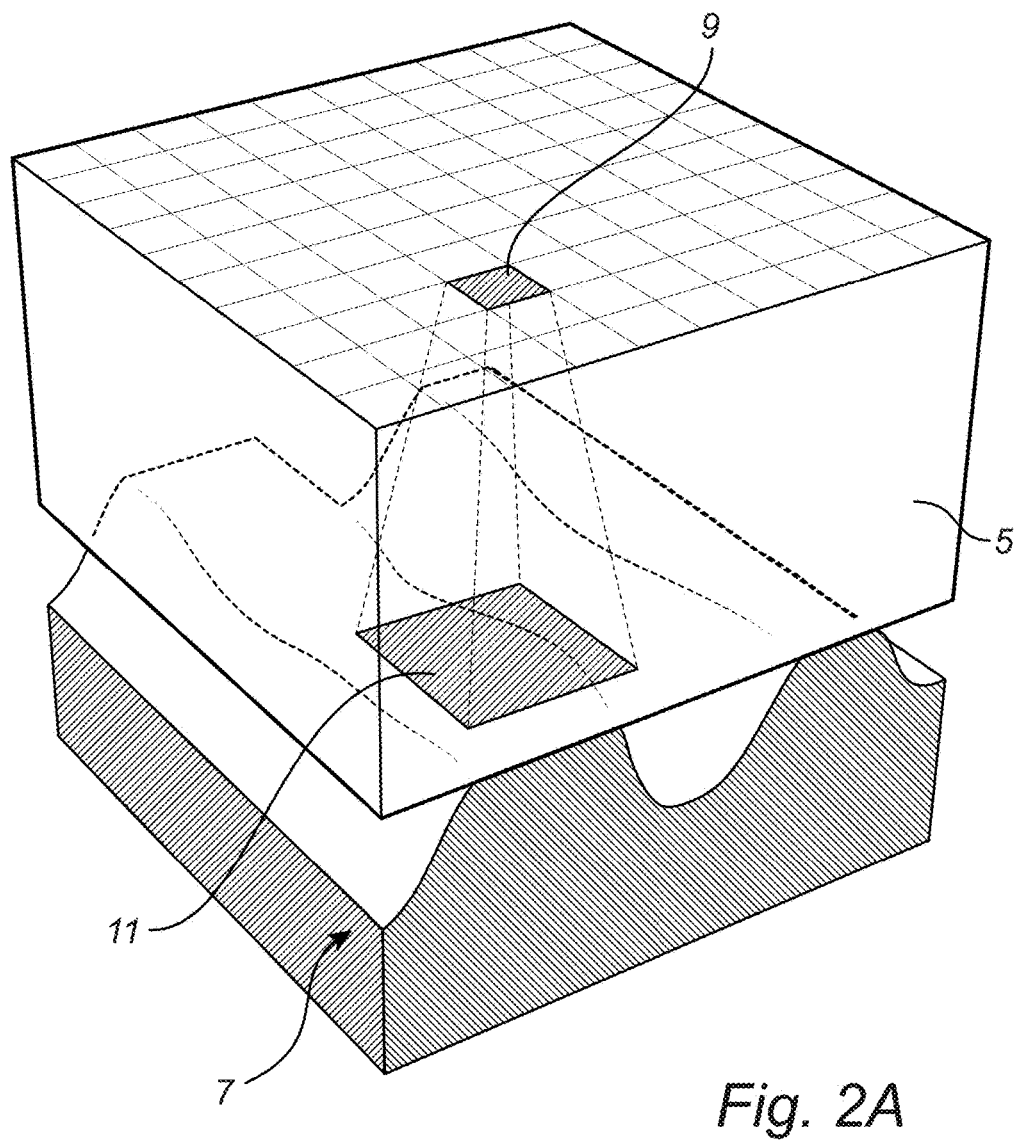
FIG. 2A is a schematic illustration of the portion of the finger surface imaged by a single sensing element using a known capacitive sensing technique.

FIG. 2A is a perspective view of a portion of a finger surface 7 in contact with the cover glass 5 in FIG. 1. On the sensor side of the cover glass 5 in FIG. 2A, areas corresponding to the measuring elements 9 of the fingerprint sensor are schematically indicated. The dimensions of the cover glass 5, the finger surface 7, and the measuring element 9 areas in FIG. 2A are approximately to scale for an example embodiment of the finger sensing system according to the present invention.

In conventional fingerprint sensing system applications, where the dielectric structure covering the sensor surface is rather thin, such as about 0.1 mm or less, the area of the finger surface sensed by a given measuring element is not very different from the area of the measuring element. This also applies to known fingerprint sensing configurations where a protective structure (such as sapphire) with dielectric anisotropy and/or a very high dielectric constant is used.

With thicker dielectric protective coatings (in particular coatings that do not exhibit dielectric anisotropy and/or a very high dielectric constant), known capacitive measurement techniques will perform spatial averaging with every measuring element, as is schematically indicated in FIG. 2A, where the finger area 11 sensed by a given measuring element 9 is schematically indicated.

With known capacitive measurement techniques, this spatial averaging will result in a blurry or defocused fingerprint image.

Figure 2B:
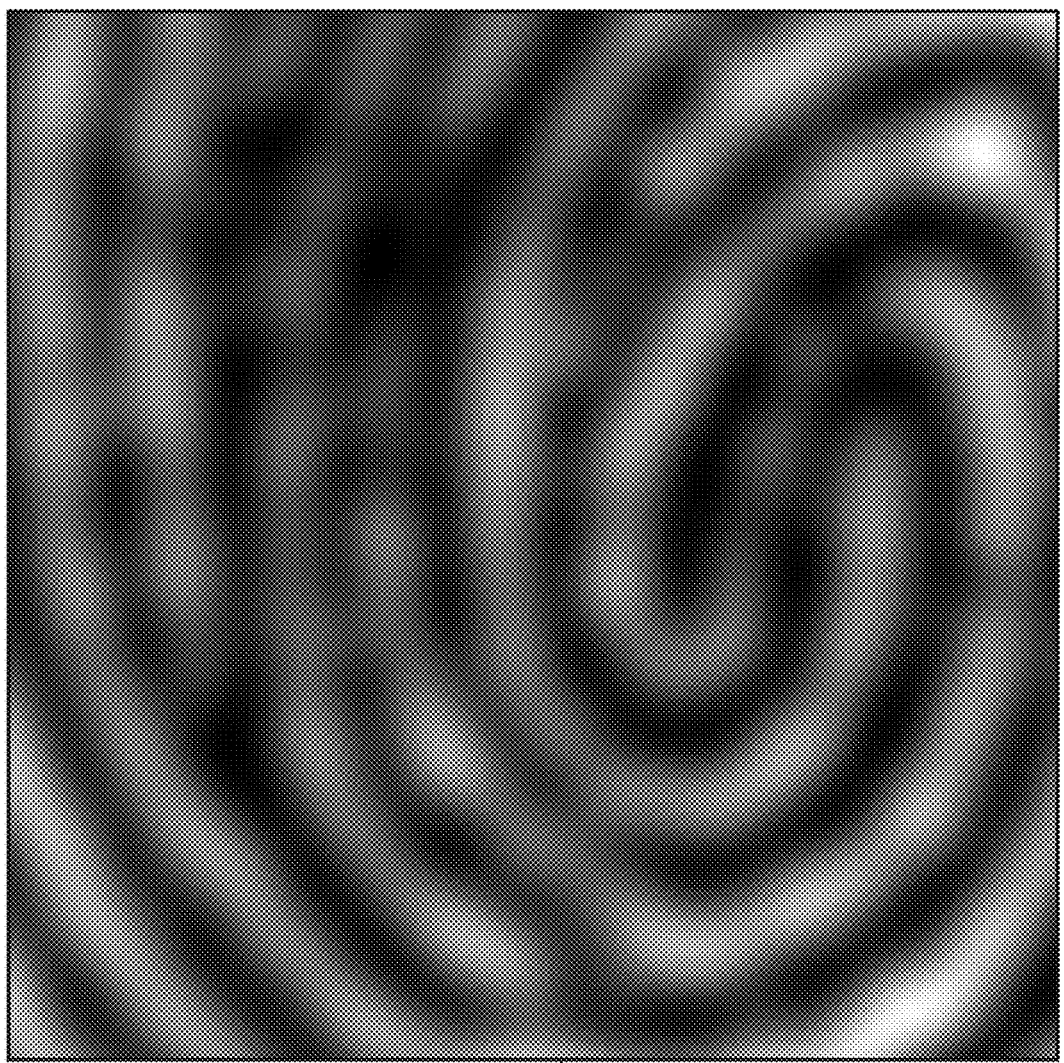
FIG. 2B is an illustration of an example simulated fingerprint image resulting from the sensing configuration in FIG. 2A using a known capacitive sensing technique.

An example of such a blurry fingerprint image 12 is shown in FIG. 2B, which is the result of a simulation of the sensing configuration in FIG. 2A using a known capacitive sensing technique.

Figure 3A:
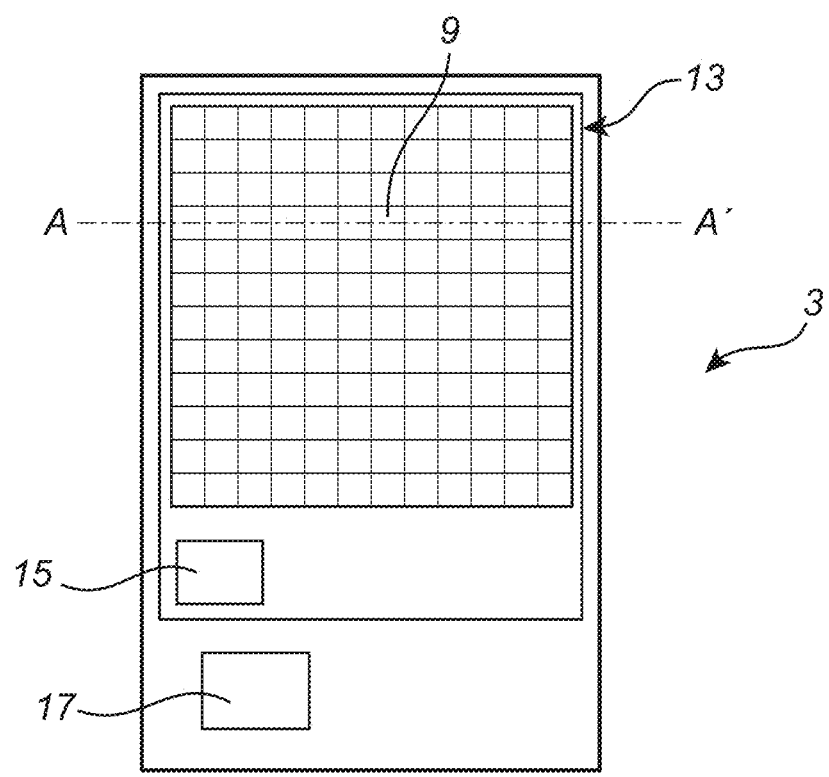
FIG. 3A is a schematic block diagram of a fingerprint system according to an embodiment of the present invention.

FIG. 3A is a schematic block diagram of a finger system 3 according to an embodiment of the present invention. Referring to FIG. 3A, the finger sensing system 3 according to this example embodiment of the invention comprises a two-dimensional measuring arrangement 13, including a plurality of measuring elements 9, measurement control circuitry in the form of a sensor controller 15, and signal processing circuitry 17. The measuring elements 9 will be described in greater detail below with reference to FIG. 3B, which is a circuit schematic cross-section view of a portion of the measuring arrangement 13 in the section indicated by the line A-A' in FIG. 2A.

In this context, it should be noted that the illustration in FIG. 3A is schematic and simplified. In an actual finger sensing system according to embodiments of the present invention, the measuring arrangement would typically comprise a considerably larger number of measuring elements. Furthermore, a typical pitch of the array of measuring elements may be around 50 µm, for a 500 pixel per inch sensor.

Furthermore, the fingerprint sensing system 3 is here schematically indicated as a single component, or a system in a package. It should, however, be understood that the functionality of the fingerprint sensing system 3 may be distributed among several components and/or software modules, such as a fingerprint sensor component and a host processor, which may be a so-called trusted element, or a so-called secure element. The functionality of the fingerprint sensing system 3 may also be partly distributed between such a trusted element and such a secure element.

Figure 3B:
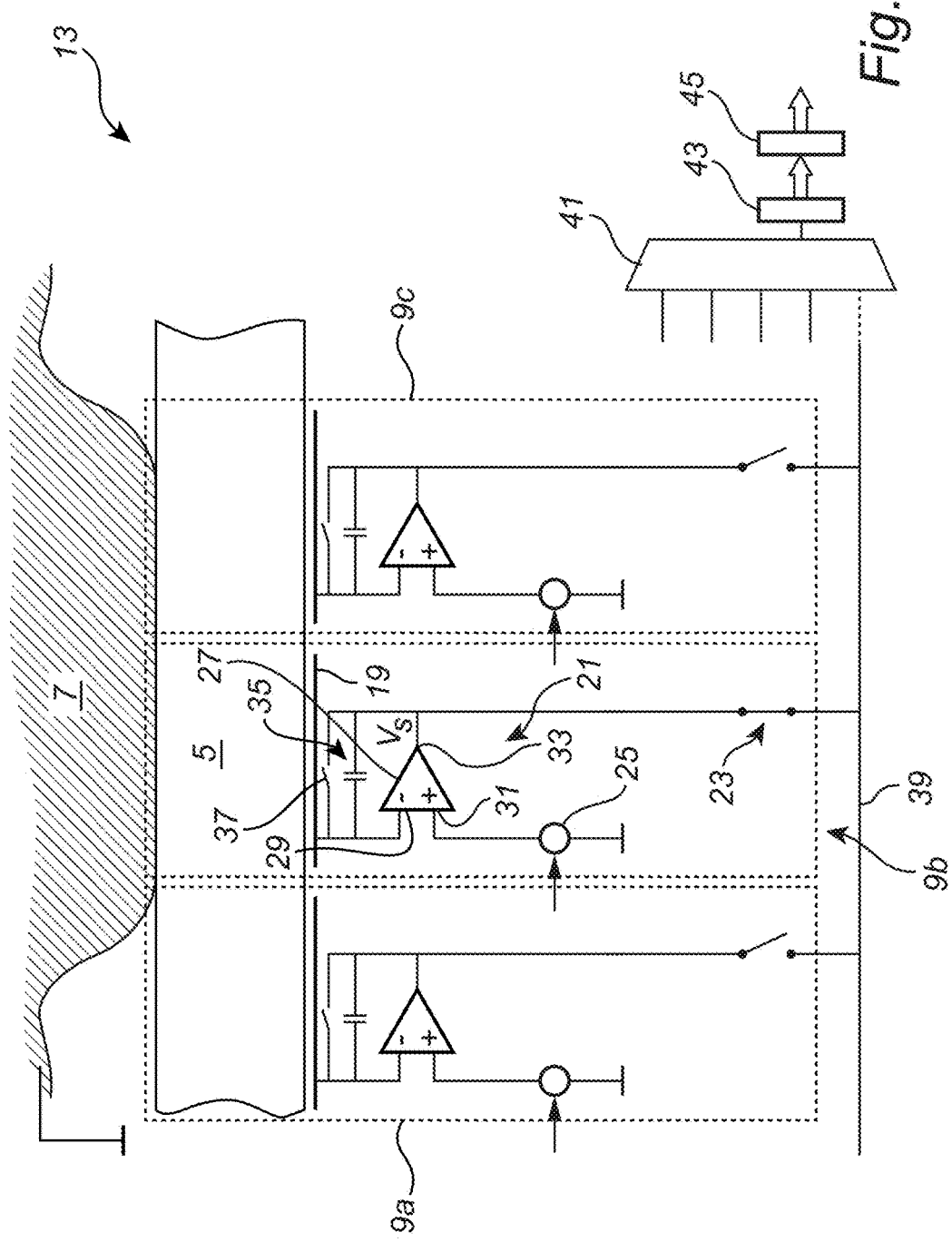
FIG. 3B is a schematic cross-section view of a portion of the fingerprint sensing system in FIG. 3A.

FIG. 3B is a schematic cross-section view of a portion of the fingerprint sensing system in FIG. 3A, with a finger 7 placed on top of the measuring arrangement 13. The measuring arrangement 13 comprises a plurality of measuring elements 9*a*-*c*.

As is schematically shown in FIG. 3B, each measuring element 9*a*-*c* (reference numerals are only indicated for one of the measuring elements to avoid cluttering the drawings) comprises a protective dielectric top layer 5, a conductive finger electrode 19 underneath the protective dielectric top layer 5, a charge amplifier 21, selection circuitry, here functionally illustrated as a simple selection switch 23 for allowing acquisition of a sensing signal from the measuring element 9*a*-*c*, and finger electrode potential providing circuitry 25 for controllably providing a selected electrical potential (constant or time-varying) to the finger electrode 19 as will be described in greater detail further below.

The charge amplifier 21 comprises at least one amplifier stage, here schematically illustrated as an operational amplifier (op amp) 27 having a first input (negative input) 29 connected to the finger electrode 19, a second input (positive input) 31 connected to the finger electrode potential providing circuitry 25, and an output 33. In addition, the charge amplifier 21 comprises a feedback capacitor 35 connected between the first input 29 and the output 33, and reset circuitry, here functionally illustrated as a switch 37, for allowing controllable discharge of the feedback capacitor 35. The charge amplifier 21 may be reset by operating the reset circuitry 37 to discharge the feedback capacitor 35.

As is often the case for an op amp 27, the electrical potential at the first input 29 follows the electrical potential applied to the second input 31. Depending on the particular amplifier configuration, the potential at the first input 29 may be substantially the same as the potential at the second input 31, or there may be a substantially fixed offset between the potential at the first input 29 and the potential at the second input 31.

Using the finger electrode potential providing circuitry 25, a desired electrical potential, which may be time-varying or substantially constant in relation to a reference potential, can be provided to the finger electrode.

The finger electrode potential providing circuitry 25 may, for instance, be implemented as a number of controllable switches for controllably connecting the second input 31 to a selected voltage line carrying the desired electrical potential to be provided to the finger electrode. Alternatively, the finger electrode potential providing circuitry may be directly connectable to the finger electrode 19, to directly provide the desired electrical potential to the finger electrode.

Through control of the finger electrode potential providing circuitry 25, the finger electrode 19 can thus be provided with a chosen potential depending on the desired function of the particular measuring element 9 as will be described in greater detail further below.

When a given measuring element, say the center measuring element 9*b* in FIG. 3B, is to function as a sensing measuring element, capable of providing a sensing signal indicating a capacitive coupling between the finger electrode of the sensing measuring element and the finger electrode of another measuring element, say either or both of the neighboring measuring elements 9*a*, 9*c*, the finger electrode potential providing circuitry 25 of the center measuring element 9*b* may, for example, be controlled to provide a substantially constant sensing finger electrode potential, in relation to a sensor ground potential, to the second input 31. At the same time, the finger electrode potential providing circuits of the neighboring measuring elements 9*a*, 9*c* may then be controlled to provide a different sensing finger electrode potential to the second inputs of the neighboring measuring elements 9*a*, 9*c*. This different sensing finger electrode potential may be time-varying in relation to a sensor ground potential.

In FIG. 3B, the finger 7 is schematically indicated as being "grounded". It should be understood that the finger "ground" may be different from the sensor ground. For instance, the finger 7 may be at the ground potential of the electronic device 1 in which the fingerprint sensing system 3 is included. Alternatively, the body may be considered to have such a large electrical "mass" that the potential of the finger remains substantially constant when the potential of a finger electrode 19 varies.

The above-described change in potential difference between the finger electrode 19 of the sensing measuring element 9*b*, and the finger electrodes of the neighboring measuring elements 9*a*, 9*c*, results in a sensing signal Vs on the output 33 of the charge amplifier 21.

When the indicated sensing element 9*b* is thus controlled to be a sensing measuring element, the selection switch 23 is closed to connect the output 33 of the charge amplifier 21 to the readout line 39. The readout line 39, which may be a common readout line for a row or a column of the 2D measuring arrangement 13, is shown in FIG. 3B to be connected to a multiplexer 41. As is schematically indicated in FIG. 3B, additional readout lines providing sensing signals from other rows/columns of the measuring arrangement 13 are also connected to the multiplexer 41.

The sensing signals Vs from the sensing measuring element 9*b* are demodulated by sample-and-hold circuitry 43. The output of the sample-and-hold circuitry 43 is connected to an analog-to-digital converter 45 for converting the analog DC voltage signals output by the sample-and-hold circuitry to a digital representation of the measurement value for each selected sensing measuring element 9*b*.

Having now introduced an embodiment of the fingerprint sensing system of the present invention, a first example embodiment of the method according to the present invention will be described below with reference to the flow-chart in FIG. 4, and additional illustrations where indicated.

Figure 5A:
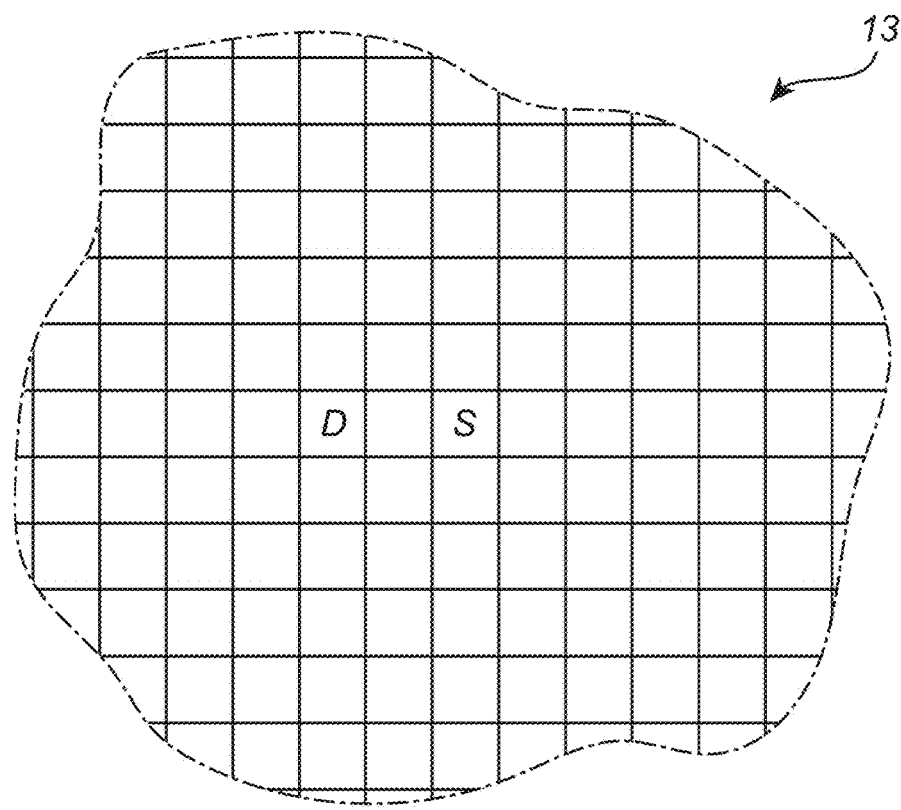
FIG. 5A schematically illustrates an example of a first sensing operation.
Figure 5A:
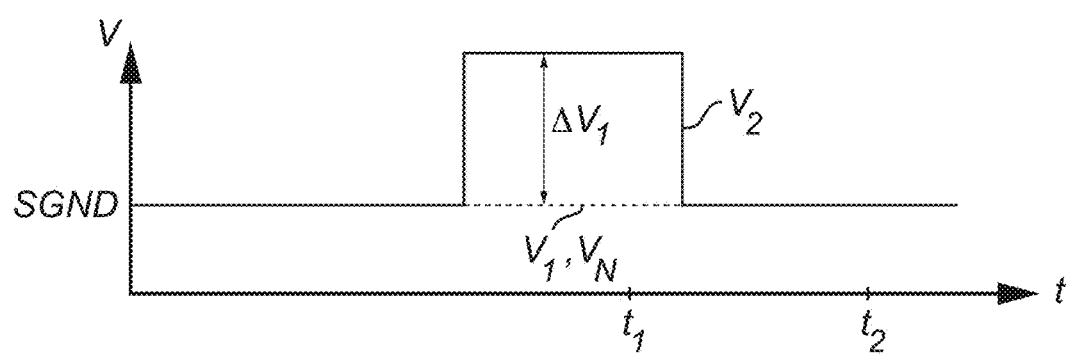

In the first step 401, a first sensing operation is performed for measuring element position n. Referring also to FIG. 5A, which schematically shows a portion of the measuring arrangement 13 in FIG. 3A, the first sensing operation is performed using an evaluated measuring element, indicated by S in FIG. 5A, that defines measuring element position n, and a first different measuring element, indicated by D in FIG. 5A. The first different measuring element D is here spaced apart from the evaluated measuring element (which is here a sensing measuring element) S by a non-sensing measuring element indicated by an empty square in FIG. 5A. In the particular example of FIG. 5A, all other measuring elements in the vicinity (such as, say, within ten measuring elements) of the sensing measuring element S are also non-sensing measuring elements.

As is schematically indicated by the dashed line in the voltage-time diagram in FIG. 5A, the finger electrode of the evaluated sensing measuring element S exhibits a first, substantially constant, finger electrode potential V1, in relation to sensor ground, SGND. The finger electrode of the first different measuring element D exhibits a second finger electrode potential V2, indicated by the solid line in the diagram in FIG. 5A. As can be seen in the voltage-time diagram in FIG. 5A, the second finger electrode potential V2 is time-varying in relation to SGND, and in the relation to the first finger electrode potential V1, so that there is a first voltage difference ΔV1 between the finger electrode of the evaluated sensing measuring element S and the finger electrode of the first different measuring element D. In the example measurement configuration of FIG. 5A, the non-sensing measuring elements are controlled to provide a finger electrode potential VN that is substantially the same as the first finger electrode potential V1.

In the subsequent step 402, a first measurement value is acquired, by the signal processing circuitry 17 from the measuring arrangement 13, based on a first sensing signal from the evaluated sensing measuring element S. To reduce the occurrence of common mode noise, the, per se well-known, correlated double sampling technique may advantageously be used. Referring to FIG. 5A and FIG. 3B, a first sample of the sensing signal Vs is taken by the sample-and-hold circuitry 43 at a first sampling time t1, and a second sample of the sensing Vs is taken by the sample-and-hold circuitry 43 at a second sampling time t2. The difference between sampled values is converted to a digital first measurement value for measurement position n by the analog-to-digital converter 45.

When the above-described steps 401 and 402 have been carried out for all measurement positions in the measurement arrangement 13, by going through the loop defined additionally by steps 403 and 404, a complete first fingerprint image has been acquired.

Figure 4:
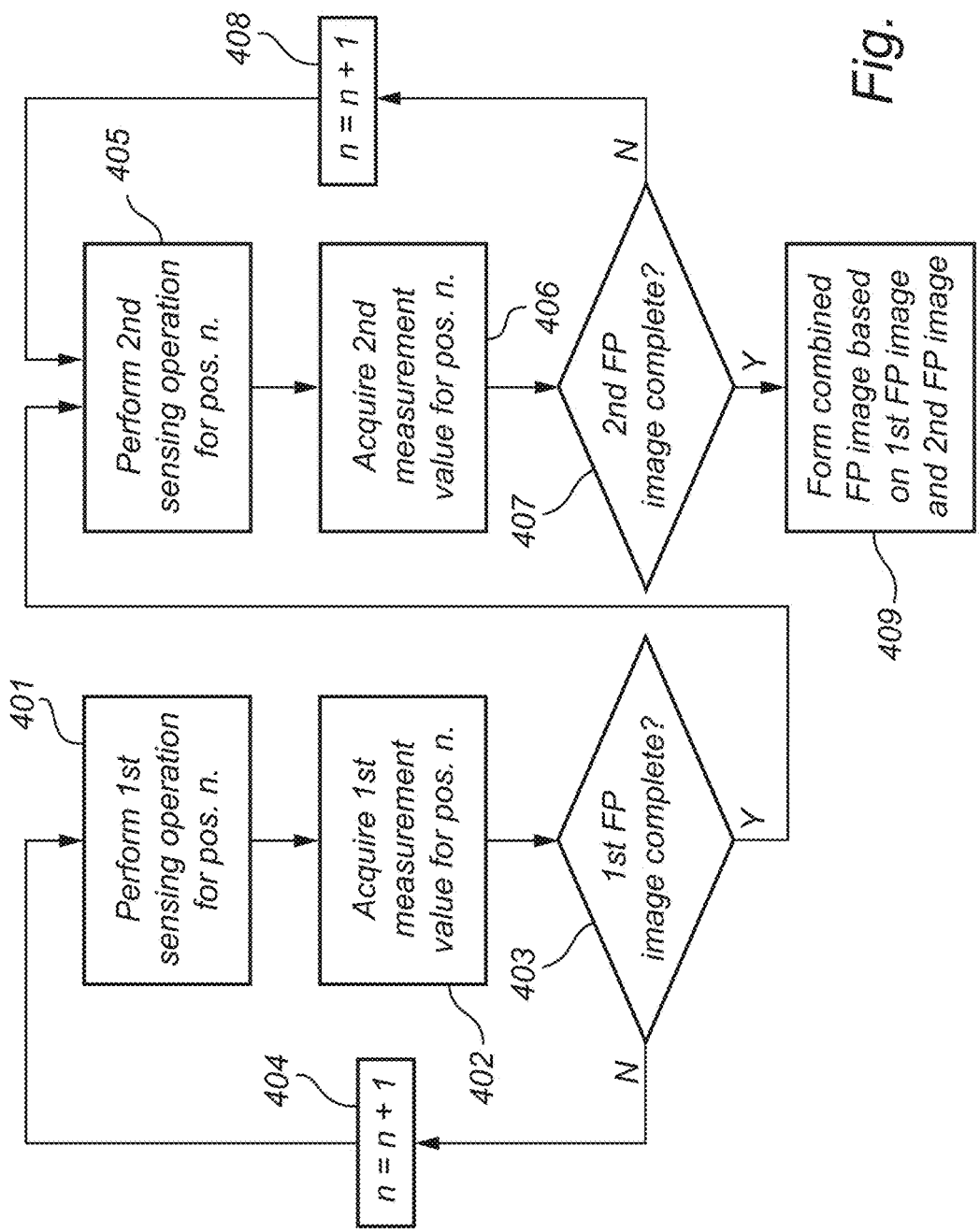
FIG. 4 is a flow-chart illustrating a method according to a first embodiment of the present invention.
Figure 5B:
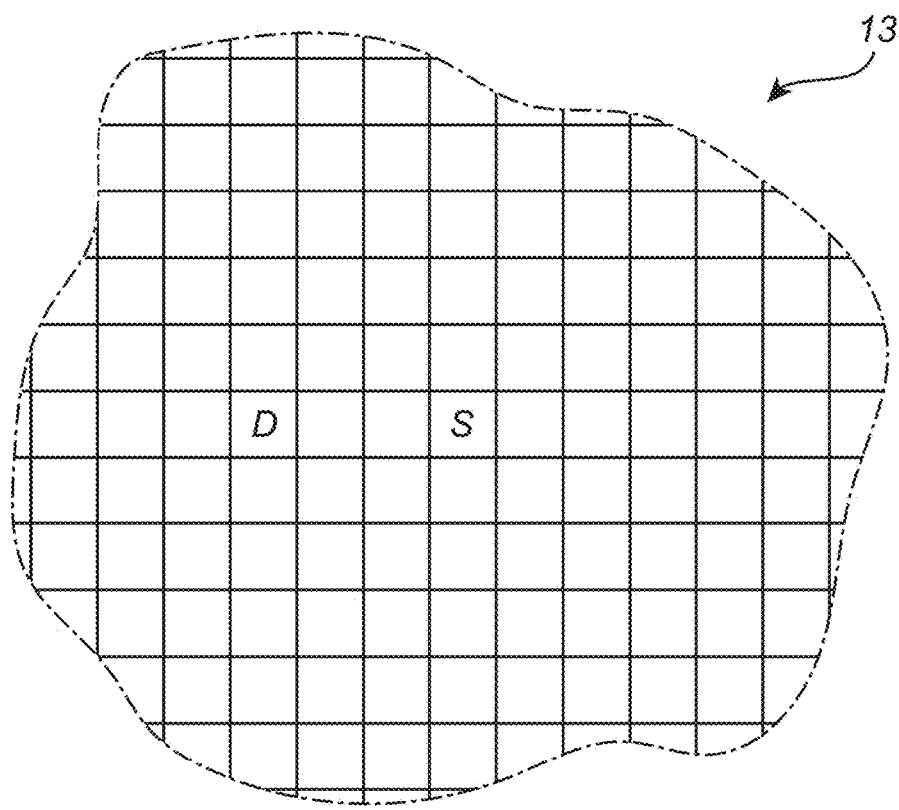
FIG. 5B schematically illustrates an example of a second sensing operation.
Figure 5B:
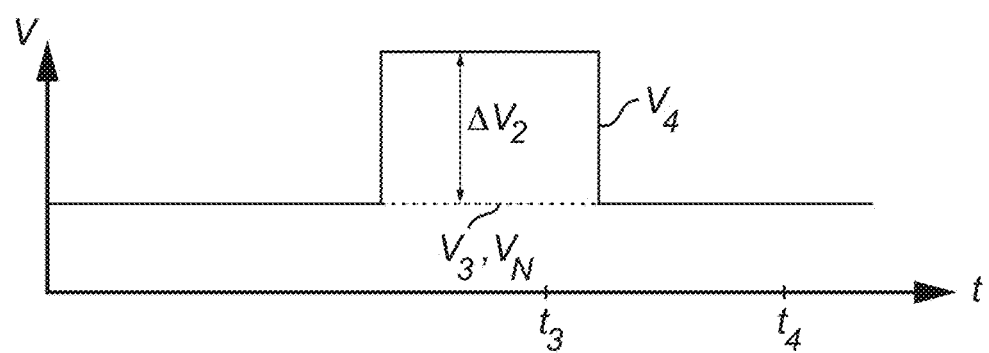

In the example embodiment illustrated by the flow chart in FIG. 4, the method then proceeds to step 405, in which a second sensing operation is performed for measuring element position n. Referring also to FIG. 5B, which schematically shows a portion of the measuring arrangement 13 in FIG. 3A, the second sensing operation is performed using an evaluated measuring element, indicated by S in FIG. 5B, that defines measuring element position n, and a second different measuring element, indicated by D in FIG. 5B. The second different measuring element D is here spaced apart from the evaluated measuring element (which is here a sensing measuring element) S by two non-sensing measuring elements indicated by empty squares in FIG. 5B. In the particular example of FIG. 5B, all other measuring elements in the vicinity (such as, say, within ten measuring elements) of the sensing measuring element S are also non-sensing measuring elements.

The lateral distance between the evaluated measuring element S and the second different measuring elements D in FIG. 5B is greater than the lateral distance between the evaluated measuring element S and the first different measuring elements D in FIG. 5A.

As is schematically indicated by the dashed line in the voltage-time diagram in FIG. 5B, the finger electrode of the evaluated sensing measuring element S exhibits a third, substantially constant, finger electrode potential V3, in relation to sensor ground, SGND. The finger electrode of the second different measuring element D exhibits a fourth finger electrode potential V4, indicated by the solid line in the diagram in FIG. 5B. As can be seen in the voltage-time diagram in FIG. 5B, the fourth finger electrode potential V4 is time-varying in relation to SGND, and in the relation to the third finger electrode potential V3, so that there is a second voltage difference ΔV2 between the finger electrode of the evaluated sensing measuring element S and the finger electrode of the second different measuring element D. In the example measurement configuration of FIG. 5B, the non-sensing measuring elements are controlled to provide a finger electrode potential VN that is substantially the same as the third finger electrode potential V3.

In the subsequent step 406, a second measurement value is acquired, by the signal processing circuitry 17 from the measuring arrangement 13, based on a second sensing signal from the evaluated sensing measuring element S. To reduce the occurrence of common mode noise, the, per se well-known, correlated double sampling technique may advantageously be used. Referring to FIG. 5B and FIG. 3B, a first sample of the sensing signal Vs is taken by the sample-and-hold circuitry 43 at a third sampling time t3, and a second sample of the sensing Vs is taken by the sample-and-hold circuitry 43 at a fourth sampling time t4. The difference between sampled values is converted to a digital first measurement value for measurement position n by the analog-to-digital converter 45.

When the above-described steps 405 and 406 have been carried out for all measurement positions in the measurement arrangement 13, by going through the loop defined additionally by steps 407 and 408, a complete second fingerprint image has been acquired.

Finally, in step 409, a combined fingerprint representation is formed based on the first fingerprint image and the second fingerprint image. An example of this procedure will be described further below with reference to FIGS. 8A-B, 9A-B, 10A-B, and 11A-B.

In the first embodiment of the method according to the present invention described above with reference to the flow-chart in FIG. 4 and the illustrations in FIGS. 5A-B, the evaluated measuring element was a sensing measuring element providing a sensing signal.

In a second embodiment of the method according to the present invention, the evaluated measuring element does not provide a sensing signal, but the first and second different measuring elements provide sensing signals. Based on these sensing signals, a combined measurement value, which is a finger coupling value for the evaluated measurement element can be determined.

Figure 6:
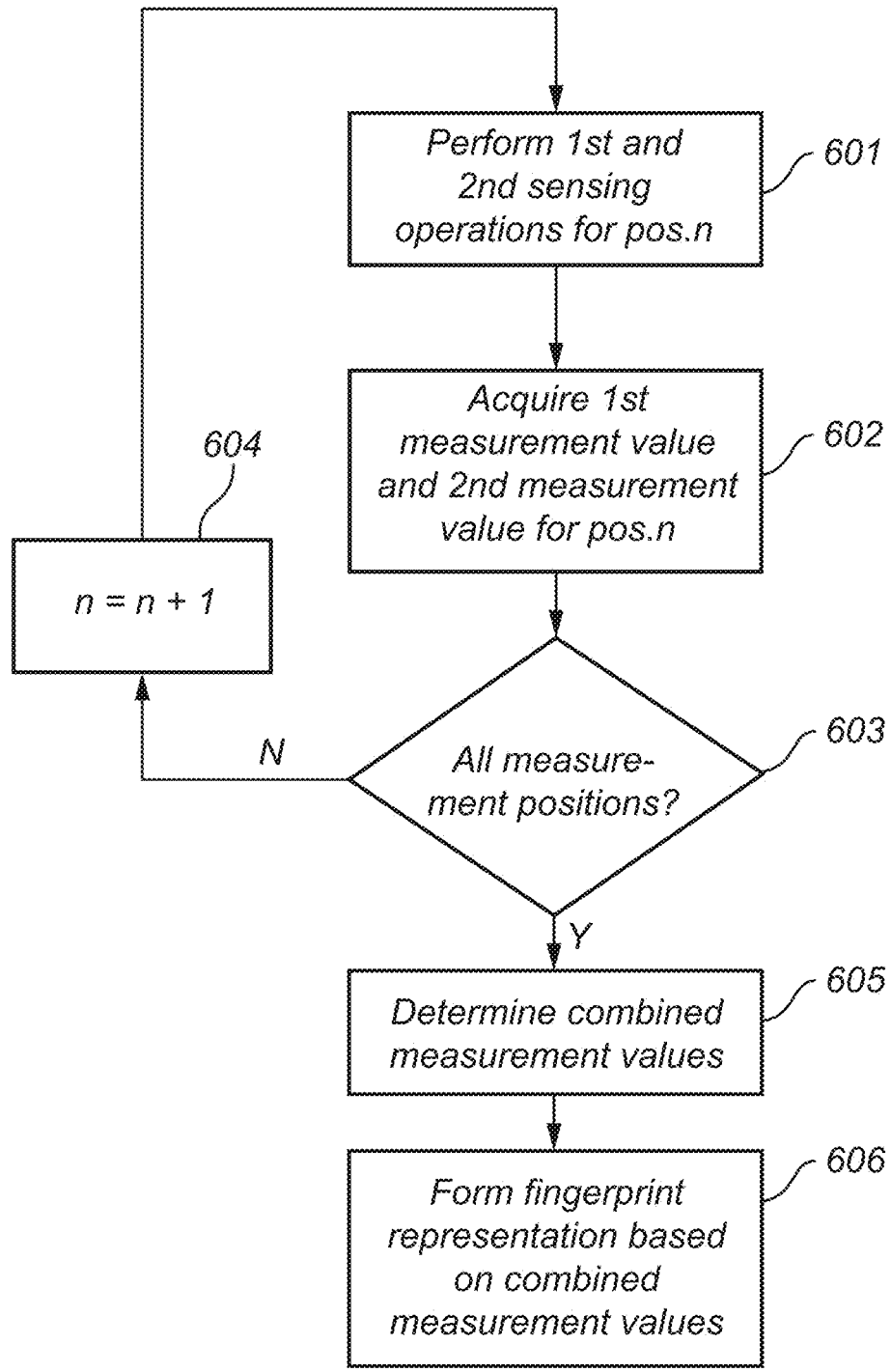
FIG. 6 is a flow-chart illustrating a method according to a second embodiment of the present invention.

Referring to the flow-chart in FIG. 6, first and second sensing operations are simultaneously performed for measuring element position n in a first step 601.

Figure 7:
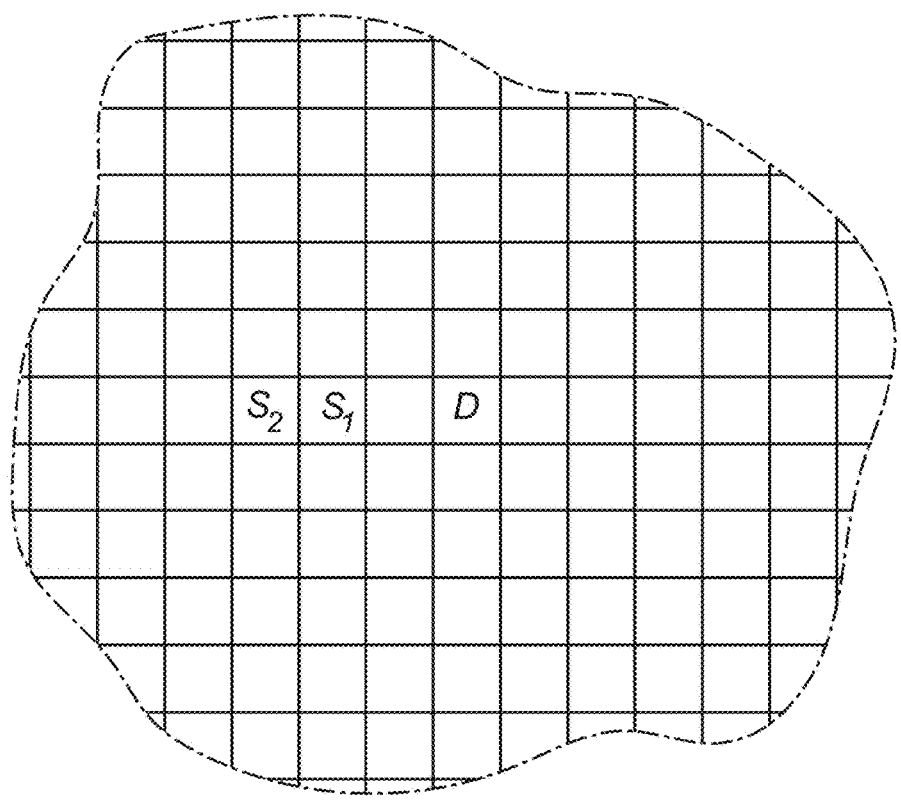
FIG. 7 schematically illustrates an example of simultaneous first and second sensing operations.
Figure 7:
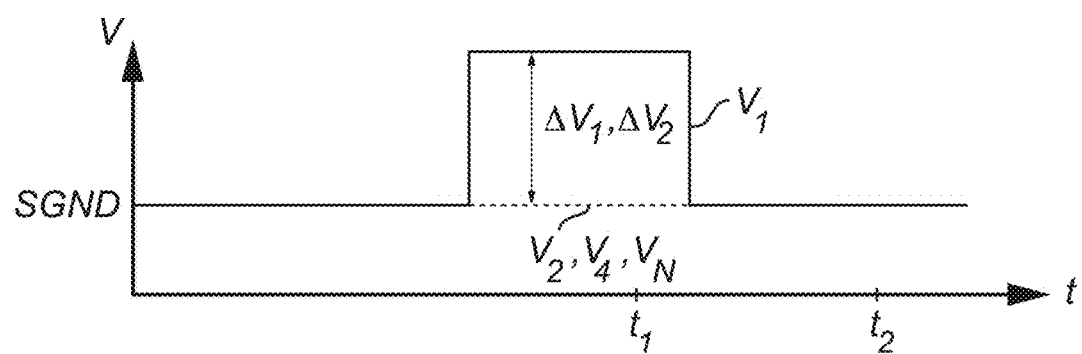

Referring also to FIG. 7, which schematically shows a portion of the measuring arrangement 13 in FIG. 3A, the first sensing operation is performed using an evaluated measuring element, indicated by D in FIG. 7, that defines measuring element position n, and a first different measuring element, indicated by S1 in FIG. 7. The first different measuring element S1 is here spaced apart from the evaluated measuring element D by a single non-sensing measuring element indicated by an empty square in FIG. 7. In the particular example of FIG. 7, all other measuring elements in the vicinity (such as, say, within ten measuring elements) of the evaluated measuring element D are also non-sensing measuring elements.

The second sensing operation, which is here performed simultaneously with the first sensing operation, uses the evaluated measuring element D, and a second different measuring element, indicated by S2 in FIG. 7. The second different measuring element S2 is further away from the evaluated measuring element D than the first different measuring element S1.

As is schematically indicated by the solid line in the voltage-time diagram in FIG. 7, the finger electrode of the evaluated sensing measuring element D exhibits a first, time-varying, finger electrode potential V1, in relation to sensor ground, SGND. The finger electrode of the first different measuring element S1, exhibits a substantially constant second finger electrode potential V2, indicated by the dashed line in the diagram in FIG. 7. Further, the finger electrode of the second different measuring element S2, exhibits a substantially constant fourth finger electrode potential V4. In this particular example, the second finger electrode potential V2 is substantially identical to the fourth finger electrode potential V4. It should be noted that the second finger electrode potential V2 and the fourth finger electrode potential V4 may be mutually different.

As can be seen in the voltage-time diagram in FIG. 7, there is a first voltage difference ΔV1 between the finger electrode of the evaluated sensing measuring element D and the finger electrode of the first different measuring element S1, and a second voltage difference ΔV2 between the finger electrode of the evaluated sensing measuring element D and the finger electrode of the second different measuring element S2.

In the subsequent step 602, a first measurement value is acquired, by the signal processing circuitry 17 from the measuring arrangement 13, based on a first sensing signal from the first different measuring element S1, and a second measurement value is acquired based on a second sensing signal from the second different measuring element S2. To reduce the occurrence of common mode noise, the, per se well-known, correlated double sampling technique may advantageously be used. Referring to FIG. 7 and FIG. 3B, a first sample of the sensing signal Vs for the first different measuring element S1 and the second different measuring element S2 may be taken by the sample-and-hold circuitry 43 at a first sampling time t1, and a second sample of the sensing Vs may be taken by the sample-and-hold circuitry 43 at a second sampling time t2. The differences between sampled values are converted to digital first measurement values and second measurement values by the analog-to-digital converter 45.

Alternatively, or in addition, the difference between the sensing signals from the first S1 and second S2 different measuring elements may be acquired to reduce the influence of the common mode signal.

When the above-described steps 601 and 602 have been carried out for all measurement positions in the measurement arrangement 13, by going through the loop defined additionally by steps 603 and 604, the method proceeds to step 605, where combined measurement values are determined based on the above-mentioned first measurement values and second measurement values.

Finally, in step 606, a fingerprint representation is determined based on the combined measurement values.

An example of how to a combination of measurement values obtained in sensing operations with different measurement configurations can be used for determining a physical property of a finger will now be described with reference to FIGS. 8A-B, FIGS. 9A-B, FIGS. 10A-B and FIGS. 11A-B. In this example, the physical property is a representation of the fingerprint of the finger. In particular, a sharpened fingerprint image is obtained. It should be noted that other weights may be assigned to the different measurement values resulting from the different measurement operations to achieve an even sharper combination fingerprint image. It should also be noted, that the different weights may be provided as voltages in connection with the respective measuring operations, when combining fingerprint images obtained using the different measuring configurations, or as a combination thereof. Furthermore, the physical property of the finger need not necessarily be the fingerprint image for use for enrolment or authentication, but the physical property may, for instance, alternatively be an indication of the distribution of moisture across the finger surface etc. Finally, the weights used in the example embodiment described below are merely examples. Although these example weights provide an improved, sharpened fingerprint image, it is highly likely that it will be possible to determine other weights that will provide an even sharper fingerprint image.

Figure 8A:
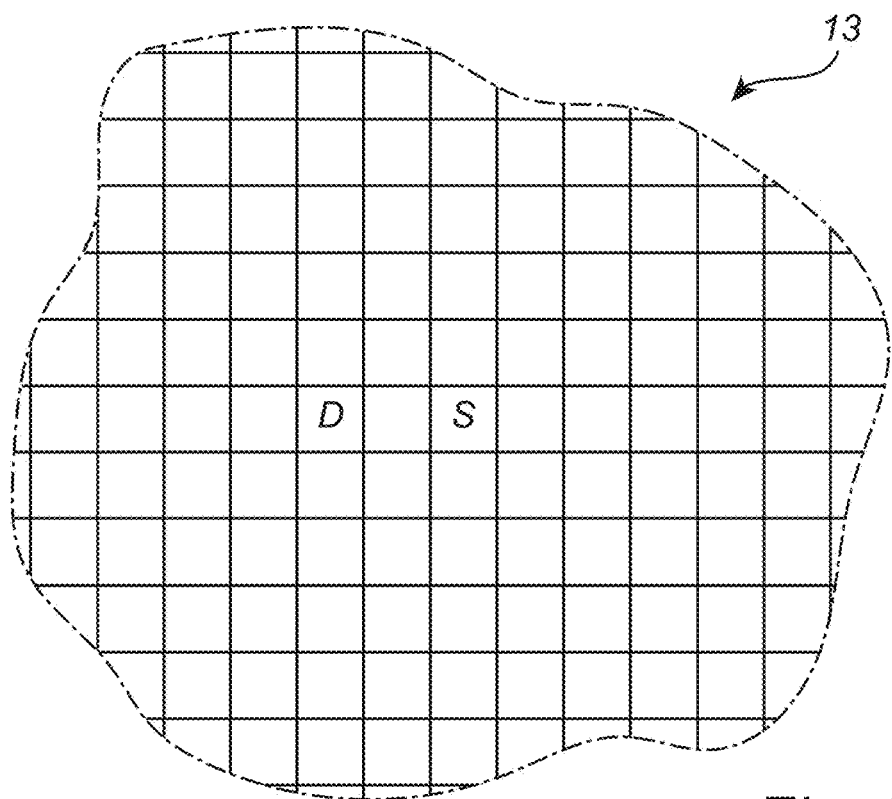
FIG. 8A schematically indicates a first measuring element configuration.

FIG. 8A schematically indicates a first measuring element configuration, which is the same as the measuring element configuration shown in FIG. 5A and described above.

Figure 8B:
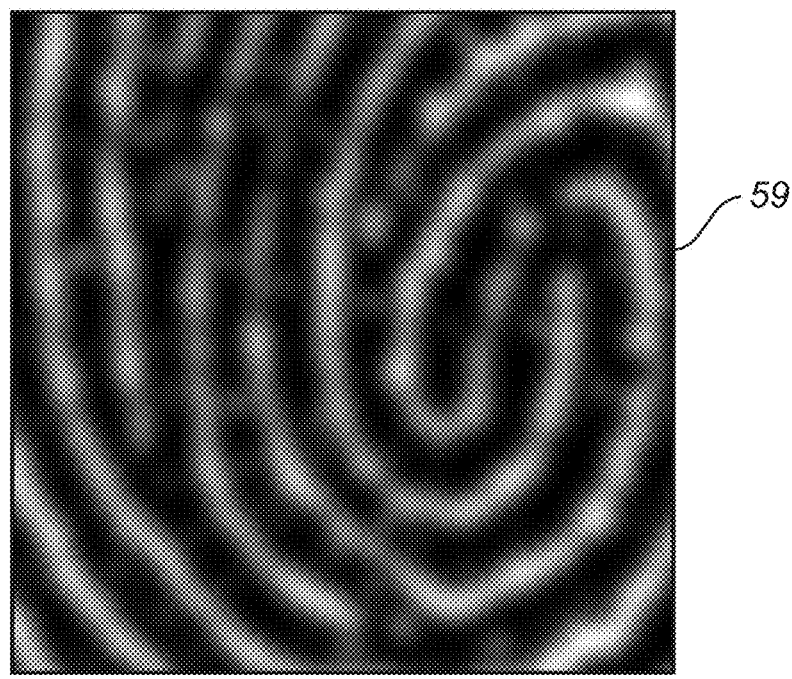
FIG. 8B is an illustration of an example simulated fingerprint image resulting from the measuring element configuration in FIG. 8A in which the finger electrodes are separated from the user's finger by a 300 µm cover glass.

FIG. 8B shows a first fingerprint image 59 resulting from a simulation using the above-described first measuring arrangement configuration in FIG. 8A. Apart from the measuring arrangement configuration used, all other simulation parameters are identical to those used for the simulation resulting in the fingerprint image 12 in FIG. 2B.

Figure 9A:
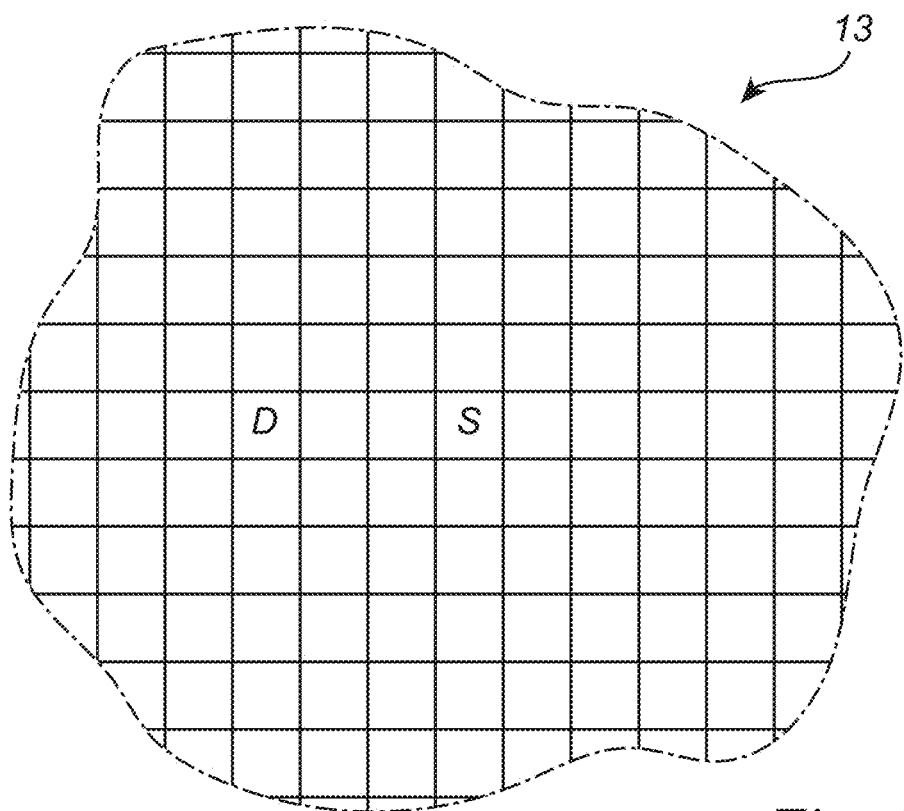
FIG. 9A schematically indicates a second measuring element configuration.

FIG. 9A schematically indicates a second measuring element configuration, which is the same as the measuring element configuration shown in FIG. 5B and described above.

Figure 9B:
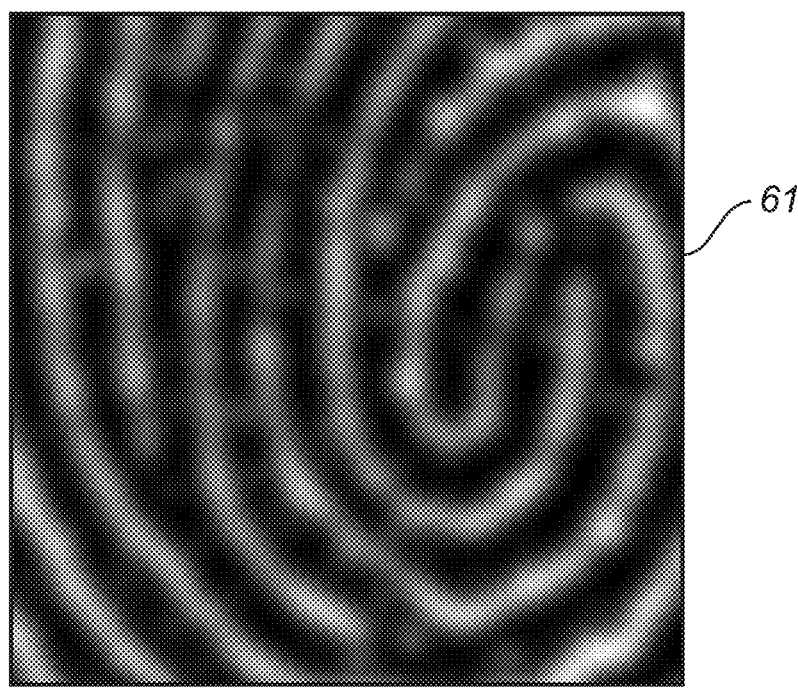
FIG. 9B is an illustration of an example fingerprint image resulting from the measuring element configuration in FIG. 9A in which the finger electrodes are separated from the user's finger by a 300 µm cover glass.

FIG. 9B shows a second fingerprint image 61 resulting from a simulation using the above-described second measuring arrangement configuration in FIG. 9A. Apart from the measuring arrangement configuration used, all other simulation parameters are identical to those used for the simulation resulting in the fingerprint image 12 in FIG. 2B.

Figure 10A:
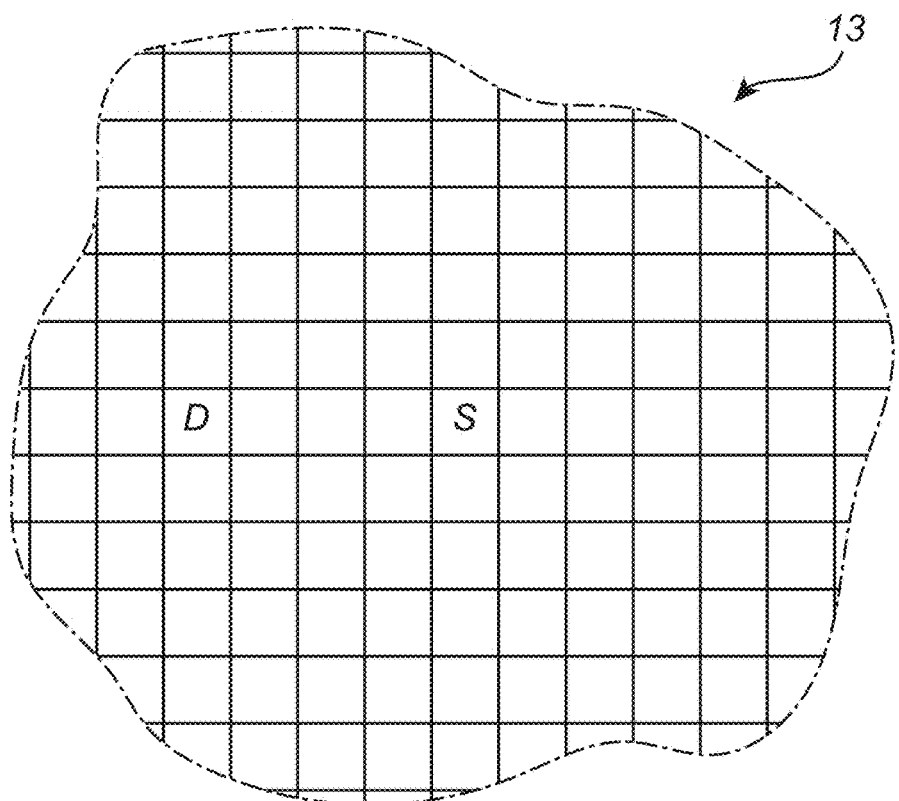
FIG. 10A schematically indicates a third measuring element configuration.

FIG. 10A schematically indicates a third measuring element configuration, with three non-sensing measuring elements separating the evaluated (here sensing) measuring element S and the third different (here driving) measuring element D.

Figure 10B:
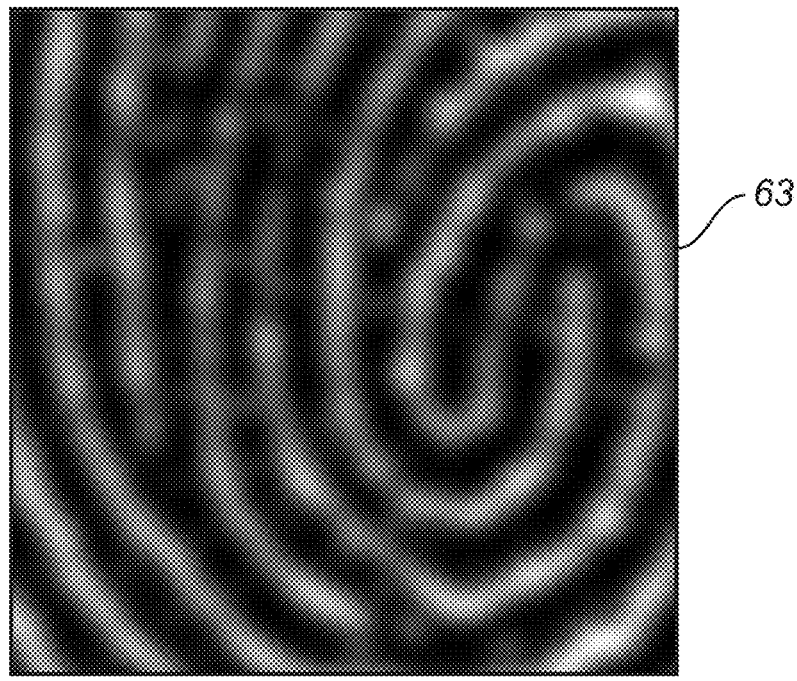
FIG. 10B is an illustration of an example fingerprint image resulting from the measuring element configuration in FIG. 10A in which the finger electrodes are separated from the user's finger by a 300 µm cover glass.

FIG. 10B shows a third fingerprint image 63 resulting from a simulation using the above-described third measuring arrangement configuration in FIG. 10A. Apart from the measuring arrangement configuration used, all other simulation parameters are identical to those used for the simulation resulting in the fingerprint image 12 in FIG. 2B.

Figure 11A:
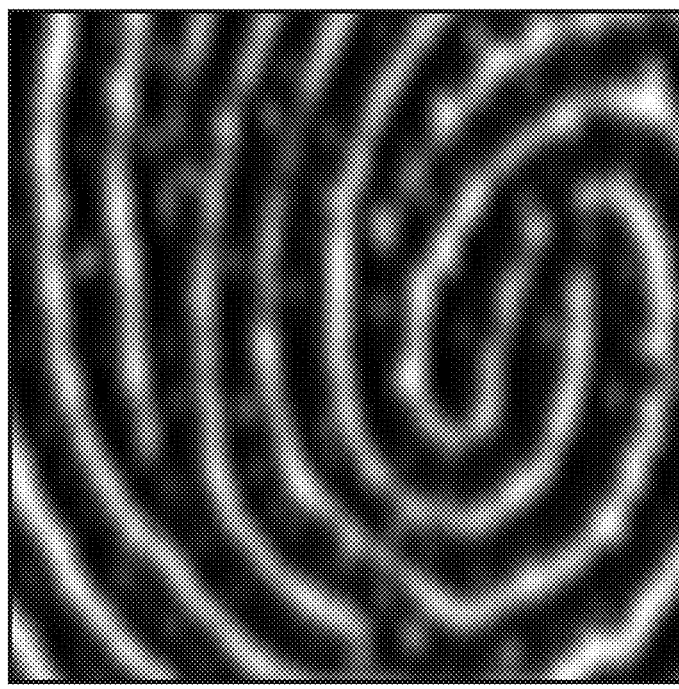
FIG. 11A is a combination fingerprint image of the with different weights assigned to the fingerprint images in FIG. 8B, FIG. 9B and FIG. 9C, respectively.

To arrive at a desired improved representation of the fingerprint pattern, the first fingerprint image 59 in FIG. 8B, the second fingerprint image 61 in FIG. 9B, and the third fingerprint image 63 in FIG. 10B are combined to the combination fingerprint image 65 shown in FIG. 11A. The combination fingerprint image 65 has been formed by forming a weighted pixel-per-pixel average of the first 59, second 61 and third 63 images. In the example combination image 65 of FIG. 11A, the first relative weight applied to the measurement values of the first fingerprint image 59 is '−1', the second relative weight applied to the measurement values of the second fingerprint image 61 is '+3', and the third relative weight applied to the measurement values of the third fingerprint image 63 is '−2'.

Figure 11B:
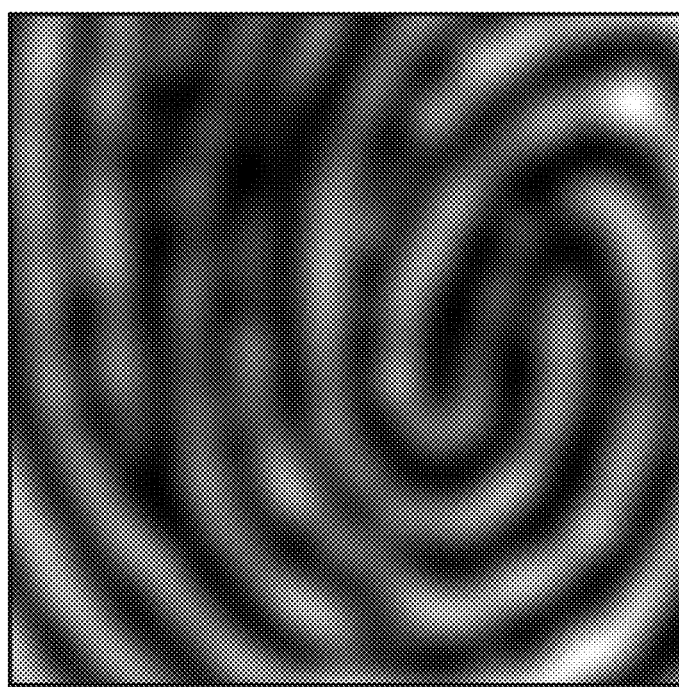
FIG. 11B is the same fingerprint image as in FIG. 2B for comparison.

Comparing this combination fingerprint image 65 with the fingerprint image 12 in FIG. 2B, which is repeated as FIG. 11B to facilitate comparison, it is clear that even a relatively simple combination of measurement values from different sensing operations with different measurement configurations results in a considerably sharper simulated fingerprint image 65.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of determining a physical property of a finger using a sensor comprising a two-dimensional measuring arrangement including a plurality of measuring elements, each defining a measuring element position in said measuring arrangement, and each comprising a finger electrode spaced apart from said finger by a dielectric structure,
said method comprising the steps of:
performing, for each measuring element position, a first sensing operation using an evaluated measuring element defining said measuring element position, and at least a first different measuring element defining a first different measuring element position, the finger electrode of said evaluated measuring element exhibiting a first finger electrode potential and the finger electrode of said first different measuring element exhibiting a second finger electrode potential different from said first finger electrode potential to provide a first potential difference between the finger electrode of said evaluated measuring element and the finger electrode of said first different measuring element;
acquiring, for each measuring element position, a first measurement value based on a first sensing signal from one of said evaluated measuring element and said first different measuring element, resulting in a plurality of first measurement values;
performing, for each measuring element position, a second sensing operation using said evaluated measuring element, and at least a second different measuring element defining a second different measuring element position, the finger electrode of said evaluated measuring element exhibiting a third finger electrode potential and the finger electrode of said second different measuring element exhibiting a fourth finger electrode potential different from said third finger electrode potential to provide a second potential difference between the finger electrode of said evaluated measuring element and the finger electrode of said second different measuring element;
acquiring, for each measuring element position, a second measurement value based on a second sensing signal from one of said evaluated measuring element and said second different measuring element, resulting in a plurality of second measurement values; and
determining the physical property of said finger based on said plurality of first measurement values and said plurality of second measurement values.

2. The method according to claim 1, wherein:
said first sensing signal is indicative of a charge carried by the finger electrode of the one of said evaluated measuring element and said first different measuring element providing said first sensing signal; and
said second sensing signal is indicative of a charge carried by the finger electrode of the one of said evaluated measuring element and said second different measuring element providing said second sensing signal.

3. The method according to claim 1, wherein:
said first different measuring element is arranged at a first lateral distance from said evaluated measuring element; and
said second different measuring element is arranged at a second lateral distance from said evaluated measuring element, said second lateral distance being different from said first lateral distance.

4. The method according to claim 3, wherein the determination of the physical property of said finger is further based on said first lateral distance and said second lateral distance.

5. The method according to any claim 1, wherein:
the step of performing, for each measuring element position, said first sensing operation comprises changing said first potential difference from being a first potential difference value at a first point in time to being a second potential difference value at a second point in time; and
the step of performing, for each measuring element position, said second sensing operation comprises changing said second potential difference from a being third potential difference value at a third point in time to being a fourth potential difference value at a fourth point in time.

6. The method according to claim 5, wherein:
the step of acquiring, for each measuring element position, said first measurement value from one of said evaluated measuring element and said first different measuring element comprises sampling said first sensing signal at said first point in time, and sampling said first sensing signal at said second point in time; and
the step of acquiring, for each measuring element position, said second measurement value from one of said evaluated measuring element and said second different measuring element comprises sampling said second sensing signal at said third point in time, and sampling said second sensing signal at said fourth point in time.

7. The method according to claim 1, further comprising the steps of:
performing, for each measuring element position, a third sensing operation using said evaluated measuring element, and at least a third different measuring element defining a third different measuring element position, the finger electrode of said evaluated measuring element exhibiting a fifth finger electrode potential and the finger electrode of said third different measuring element exhibiting a sixth electrode potential different from said fifth finger electrode potential to provide a third potential difference between the finger electrode of said evaluated measuring element and the finger electrode of said third different measuring element; and
acquiring, for each measuring element position, a third measurement value based on a third sensing signal from one of said evaluated measuring element and said third different measuring element, resulting in a plurality of third measurement values,
wherein the physical property of said finger is determined further based on said plurality of third measurement values.

8. The method according to claim 1, wherein the step of determining the physical property of said finger comprises the steps of:
determining, for each measuring element position, a combined measurement value for said measuring element position based on said first measurement value and said second measurement value for said measuring element position; and determining the physical property of said finger based on said combined measurement value for each measuring element position in said measuring arrangement.

9. The method according to claim 1, wherein the physical property of said finger is a representation of a fingerprint pattern of said finger.

10. A finger sensing system for determining a physical property of a finger, said finger sensing system comprising:

a two-dimensional measuring arrangement including a plurality of measuring elements, each defining a measuring element position in said measuring arrangement, and each comprising a finger electrode spaced apart from said finger by a dielectric structure;

measurement control circuitry connected to said measuring arrangement for:

controlling said measuring arrangement to perform, for each measuring element position, a first sensing operation using an evaluated measuring element defining said measuring element position, and at least a first different measuring element defining a first different measuring element position, the finger electrode of said evaluated measuring element exhibiting a first finger electrode potential and the finger electrode of said first different measuring element exhibiting a second finger electrode potential different from said first finger electrode potential to provide a first potential difference between the finger electrode of said evaluated measuring element and the finger electrode of said first different measuring element; and controlling said measuring arrangement to perform, for each measuring element position, a second sensing operation using said evaluated measuring element, and at least a second different measuring element defining a second different measuring element position, the finger electrode of said evaluated measuring element exhibiting a third finger electrode potential and the finger electrode of said second different measuring element exhibiting a fourth finger electrode potential different from said third finger electrode potential to provide a second potential difference between the finger electrode of said evaluated measuring element and the finger electrode of said second different measuring element; and signal processing circuitry for:

acquiring, for each measuring element position in said measuring arrangement, a first measurement value based on a first sensing signal from one of said evaluated measuring element and said first different measuring element, resulting in a plurality of first measurement values;

acquiring, for each measuring element position in said measuring arrangement, a second measurement value based on a second sensing signal from one of said evaluated measuring element and said second different measuring element, resulting in a plurality of second measurement values; and determining the physical property of said finger based on said plurality of first measurement values and said plurality of second measurement values.

11. The finger sensing system according claim 10, wherein each measuring element in said measuring arrangement is controllable to provide a sensing signal.

12. The finger sensing system according to claim 11, wherein said sensing signal is indicative of a charge carried by the finger electrode comprised in said measuring element.

13. The finger sensing system according to claim 11, wherein each measuring element in said measuring arrangement comprises:

a charge amplifier comprising:
 a first input;
 a second input;
 an output capacitively coupled to said first input; and
 at least one amplifier stage between said first and second inputs, and said output.

14. The finger sensing system according to claim 10, wherein said dielectric structure includes a dielectric plate, such as a glass plate.

15. An electronic device comprising:

the finger sensing system according to claim 10; and processing circuitry connected to said finger sensing system for:
 acquiring a representation of a fingerprint pattern from said finger sensing system;
 authenticating a user based on said representation; and
 performing at least one user-requested process only if said user is authenticated based on said representation.

* * * * *